July 21, 1970     W. E. SCHROEDER, JR     3,521,421

GEODESIC STRUCTURE

Filed Jan. 2, 1968

INVENTOR.
WILLIAM E. SCHROEDER, JR
BY Wolf, Greenfield + Hieken
ATTORNEYS

United States Patent Office 3,521,421
Patented July 21, 1970

---

3,521,421
GEODESIC STRUCTURE
William E. Schroeder, Jr., 47 Rutland Square,
Boston, Mass. 02118
Filed Jan. 2, 1968, Ser. No. 694,953
Int. Cl. E04h *12/10*
U.S. Cl. 52—648             7 Claims

ABSTRACT OF THE DISCLOSURE

A geodesic structure comprises a number of interconnected members. A pair of interconnected members each carry a hinge pivotal about the member axis. Overlapping hinge leaves of adjacent members are pivotally connected about a pivot axis that is between the adjacent members thus connected and orthogonal to the axis of each adjacent member.

BACKGROUND OF THE INVENTION

The present invention relates in general to geodesic structures and more particularly concerns novel structures comprising a number of geodesic structural members that are relatively easy and inexpensive to manufacture, assemble and ship.

A geodesic may be defined as the curve on a surface joining two points whose length between these points is less than that of any other curve on the surface joining them. As a practical matter geodesics may be closely approximated by straight lines for virtually any surface if the end points terminating the geodesic are sufficiently close so that the surface curvature of that portion of the surface between the points is not great. An example of a geodesic structure is the U.S. Pavilion at EXPO 67 in Montreal, Canada. That structure included a number of elements that were connected together in fixed relationship.

It is an important object of this invention to provide a novel structural element.

It is a further object of this invention to provide a novel structural element that may be interconnected with a number of like elements to form a structure that is limited only by the imagination of the designer.

It is a further object of the invention to provide structural members in accordance with one or more of the preceding objects that are relatively easy and inexpensive to manufacture and assemble.

It is a further object of the invention to achieve one or more of the preceding objects with structural members that are relatively easy and inexpensive to ship.

It is a further object of the invention to provide sturdy geodesic structures.

SUMMARY OF THE INVENTION

A structural member according to the invention carries a hinge permitting pivotal movement of the hinge leaves about a structural member axis while being maintained in fixed relative relationship along the axial direction of the member. Adjacent structural members are preferably interconnected by overlapping pairs of the hinge leaves pivotally connected about a pivot axis that is perpendicular to the axes of the adjacent members.

Numerous other features, objects and advantages of the invention will become apparent from the following specification when read in connection with the accompanying drawing in which:

DETAILED DESCRIPTION OF PREFERRED EMBODIMENTS

Figure 1:
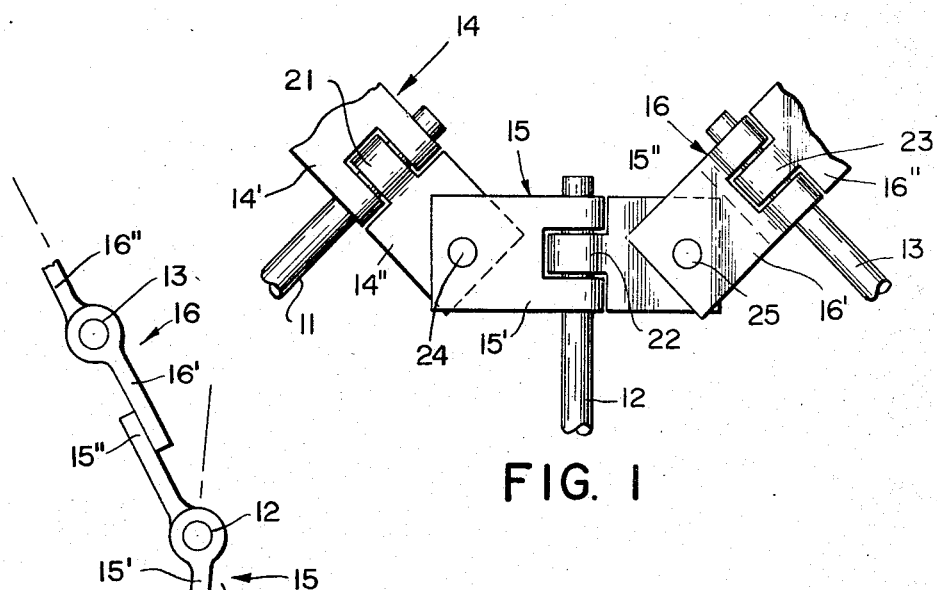
FIG. 1 is a view of three interconnected structural members according to the invention.

With reference now to the drawing and more particularly FIG. 1 thereof there is shown a perspective view of portions of structural members interconnected according to the invention. Each structural member 11, 12 and 13 typically comprises a rod or tube carrying a hinge, such as 14, 15 and 16, respectively. Each hinge includes a left leaf such as 14', 15' and 16', and a right leaf such as 14", 15" and 16". Each hinge is fixed so that the hinge is axially fixed with respect to the longitudinal axis of the associated structural member while permitting relative pivotal movement of the hinge leaves about the structural member longitudinal axis. A simple way for axially fixing an associated hinge is to secure the eye of each right hinge leaf, such as 21, 22 and 23 to members 11, 12 and 13, respectively. Alternately each hinge may be embraced by a pair of O-rings secured to a respective member. The ways of effecting such a securing are numerous and within the ordinary skill of those skilled in the art.

Figure 2:
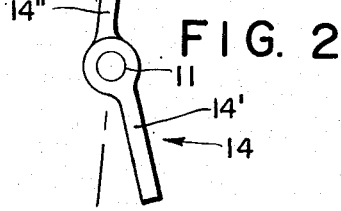
FIG. 2 is a top view of the interconnected members of FIG. 1.

Adjacent members are interconnected by overlapping adjacent hinge leaves by means, such as rivet 24 pivotally interconnecting right leaf 14" of member 11 and left leaf 15' of member 12 and rivet 25 pivotally interconnecting right leaf 15" of member 12 and left leaf 16' of member 13 so that the overlapping hinge leaves thus interconnected are pivotal about an axis perpendicular to the overlapping leaves and the longitudinal axes of the adjacent members. FIG. 2 is a top view of the assembly of FIG. 1.

Figure 3:
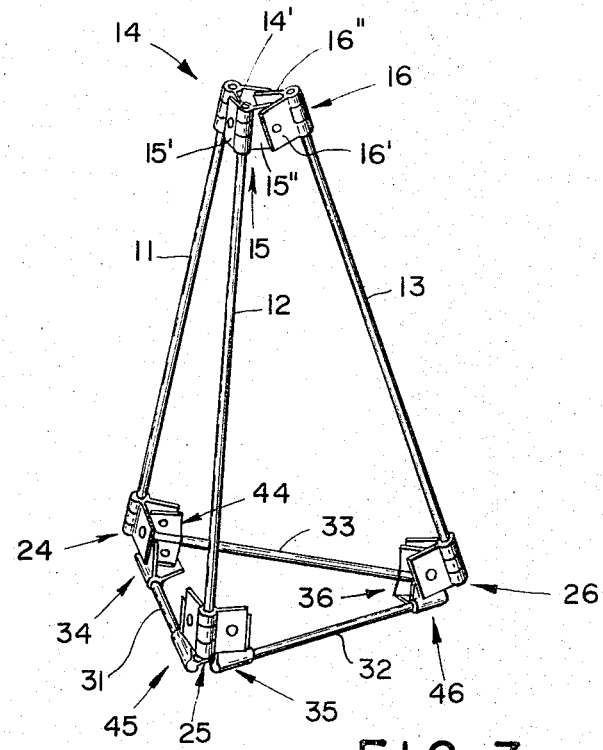
FIG. 3 is an example of a simple geodesic structure according to the invention defining a pyramid and suitable for use as a tent support, for example.

Referring to FIG. 3 there is shown a geodesic structure according to the invention in the form of a pyramid having a triangular base and triangular sides. Members 11, 12 and 13 may form the uprights of the pyramid by pivotally interconnecting right leaf 16" of hinge 16 and left leaf 14' of hinge 14.

The lower end of members 11, 12 and 13 carry hinges 24, 25 and 26, respectively. Three other members 31, 32 and 33 form the legs of the triangular base. Base members 31, 32 and 33 have at one end hinges 34, 35 and 36, respectively, and at the other end, hinges 45, 46 and 44, respectively. In one base corner hinges 24, 34 and 44 are pivotally interconnected in essentially the same manner as at the top of the pyramidical structure, in a second base corner hinges 25, 35 and 45 are similarly interconnected and in a third base corner hinges 26, 36 and 46 are similarly pivotally interconnected to provide a sturdy structure suitable for use as, for example, the frame for a tent.

By forming each hinge leaf with an opening and using a screw and nut or other suitable pin-like fastener passing through the openings in overlapping leaves to be pivotally interconnected, assembly and disassembly of this structure may be effected easily and rapidly. Moreover, the structural elements may be shipped in a container in which they are stacked side-by-side to conserve shipping space and thereby reduce shipping difficulties and costs while facilitating the construction of a relatively large and sturdy structure. Alternately, the individual hinges may be detachably secured to the respective members and secured to a member by, for example, forming the end of each member with a tapped hole and the hinge eyes with one or more clearance openings for accommodating a machine screw that may pass through the clearance opening and seat in the tapped hole in the structural member. It may also be possible to preassemble certain structures and manipulate the structure so that the structural members assume an essentially flat form for shipping. The members may then be manipulated at the erection site so that the desired structure is rapidly erected.

Figure 4:
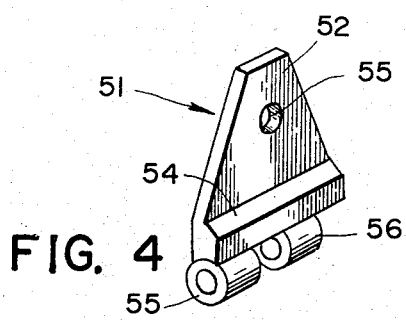
FIG. 4 is a perspective view of a preferred hinge element which may be combined with a like element to form a hinge.

Referring to FIG. 4 there is shown a perspective view of the preferred hinge element which may coact with a like element and a rod upon which they are mounted to form a structural member according to the invention. The hinge element 51 may include a leaf portion 52 formed with an opening 53 and a shoulder 54 so that leaf portion 52 is offset to facilitate overlapping with a like leaf on the hinge associated with an adjacent structural member. The hinge element 51 also includes a pair of spaced collars 55 and 56 positioned as shown for dovetailing with the collars of a like element.

Figure 5:
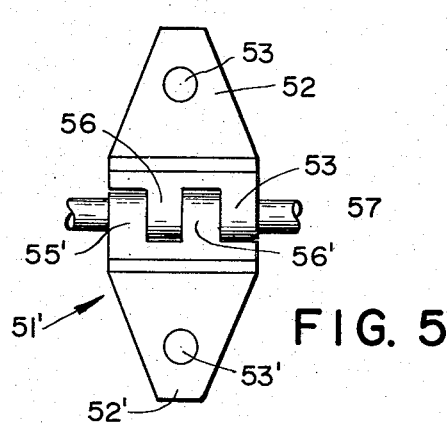
FIG. 5 is a view of a hinge thus formed supported upon the end of a structural member.

Referring to FIG. 5 there is shown element 51 coacting with like element 51' with the collars 55 and 56 of element 51 surrounding rod 57 while collars 55' and 56' also surround rod 57 in dovetailing relationship with collars 55 and 56 to coact with rod 57 and element 51 to form a structural element according to the invention. This arrangement has the advantage of using only a single hinge element, the offset leaf 52 being arranged to conveniently overlap a like leaf 52'.

There has been described novel structure facilitating construction of a wide variety of structures, easily and at low cost while permitting shipment of the structural elements easily and at low cost. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed:

1. A structural member comprising a rod-like means having a longitudinal axis,
   first hinge means carried by said rod-like means and having first and second hinge leaves relatively pivotal about said axis and maintained in fixed relationship with respect to said rod-like means in a direction along said axis,
   a second hinge means carried by said rod-like means and having first and second hinge leaves relatively pivotal about said axis and maintained in fixed relationship with respect to said rod-like means and said first hinge means in a direction along said axis, said hinge leaves being adapted for pivotal connection to an adjacent one of first and second hinge leaves of an adjacent like structural member carrying like hinge means,
   a first adjacent like structural member like said first-mentioned structural member carrying a first and second hinge means like said first-mentioned first and second hinge means,
   a leaf of said first adjacent structural member hinge means overlapping a leaf of the first-mentioned structural member hinge means and interconnected therewith for pivotal movement about a pivot axis that is perpendicular to the longitudinal axes of the first-mentioned structural member and said first adjacent structural members.

2. A structural member in accordance with claim 1 wherein said hinge means comprises a pair of like hinge elements.

3. A structural member in accordance with claim 2 wherein said like hinge elements each comprise a leaf portion that is offset from a plane parallel to said leaf portion and passing through the axis about which said each element is arranged to pivot.

4. Structural members in accordance with claim 1 and further comprising,
   a second adjacent structural member like said first-mentioned structural member carrying a like set of said first and second hinge means,
   said first-mentioned structural member, said first adjacent structural member and said second adjacent structural member being interconnected at one end of each by each of the hinge leaves thereat being in overlapping relationship with another of said hinge leaves carried by an adjacent one of said structural members and pivotally interconnected for pivotal movement about a pivot axis that is perpendicular to the longitudinal axes of adjacent ones of said structural members.

5. A structure in accordance with claim 4 and further comprising,
   a third adjacent structural member like said first-mentioned structural member carrying a like set of said first and second hinge means for similarly interconnecting the other ends of said first-mentioned structural member and said first adjacent structural member with each of said hinge leaves in overlapping relationship with another of said hinge leaves carried by an adjacent one of said structural members and pivotally interconnected for pivotal movement about a pivot axis that is perpendicular to the longitudinal axes of adjacent ones of said structural members.

6. A structure in accordance with claim 5 and further comprising,
   a fourth adjacent structural member like said first-mentioned structural member carrying a like set of said first and second hinge means for interconnecting the other ends of said first-mentioned structural member and said second adjacent structural member with each of said hinge leaves in overlapping relationship with another of said hinge leaves carried by an adjacent one of said structural members and pivotally interconnected for pivotal movement about a pivot axis that is perpendicular to the longitudinal axes of adjacent ones of said structural members.

7. A structure in accordance with claim 6 and further comprising,
   a fifth adjacent structural member like said first-mentioned structural member carrying a set of said first and second hinge means for interconnecting the other ends of said first adjacent like structural member and said second adjacent like structural member with each of said hinge leaves in overlapping relationship with another of said hinge leaves carried by an adjacent one of said structural members and pivotally interconnected for pivotal movement about a pivot axis that is perpendicular to the longitudinal axes of adjacent ones of said structural members.

References Cited

UNITED STATES PATENTS

| 140,930 | 7/1873 | Loth | 16—163 |
| 1,061,678 | 5/1913 | Lapacek | 16—163 |
| 1,435,753 | 11/1922 | Stolz | 16—163 |
| 1,554,656 | 9/1925 | Pusey | 52—648 |
| 2,855,617 | 10/1958 | Broms et al. | 52—646 X |
| 3,092,407 | 6/1963 | Blonder | 287—548 |

FRANK L. ABBOTT, Primary Examiner

S. D. BURKE, Assistant Examiner

U.S. Cl. X.R.

16—163; 287—54